United States Patent Office 2,747,736
Patented May 29, 1956

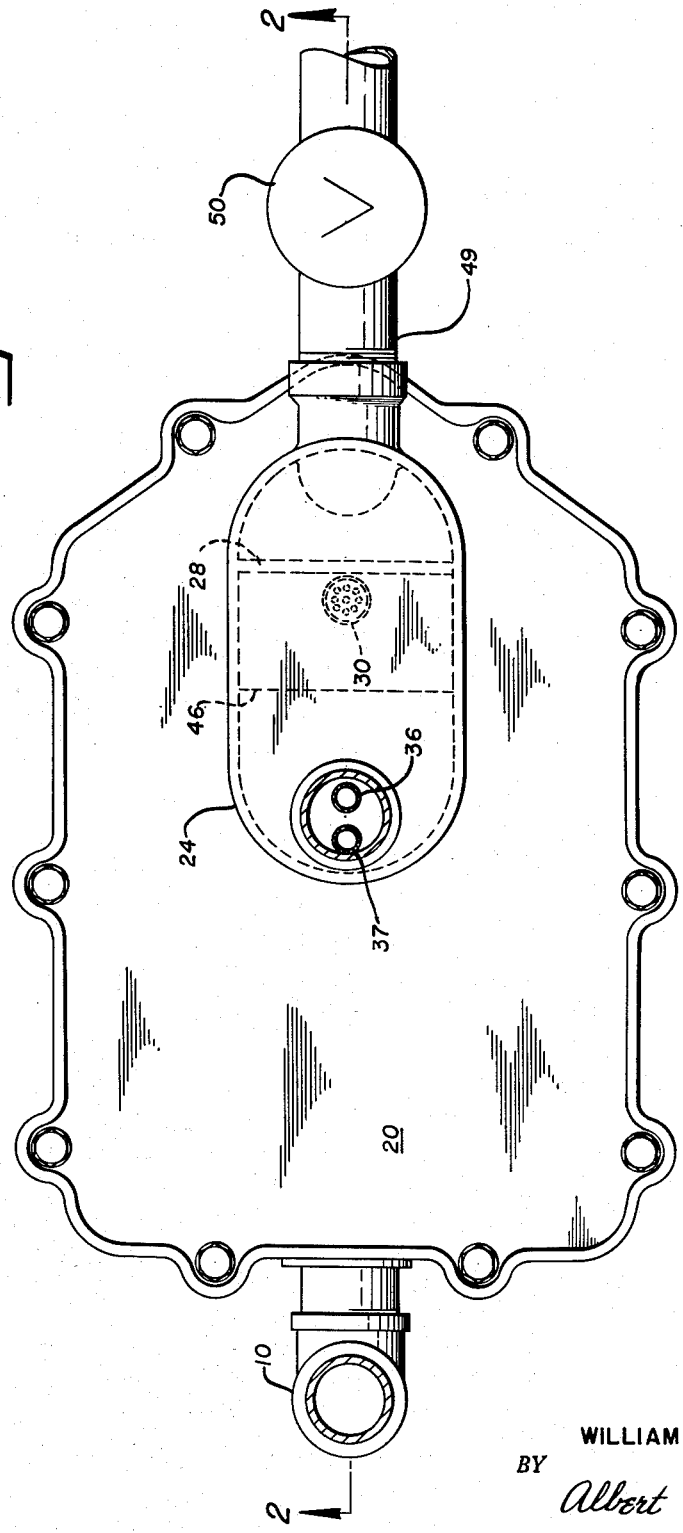

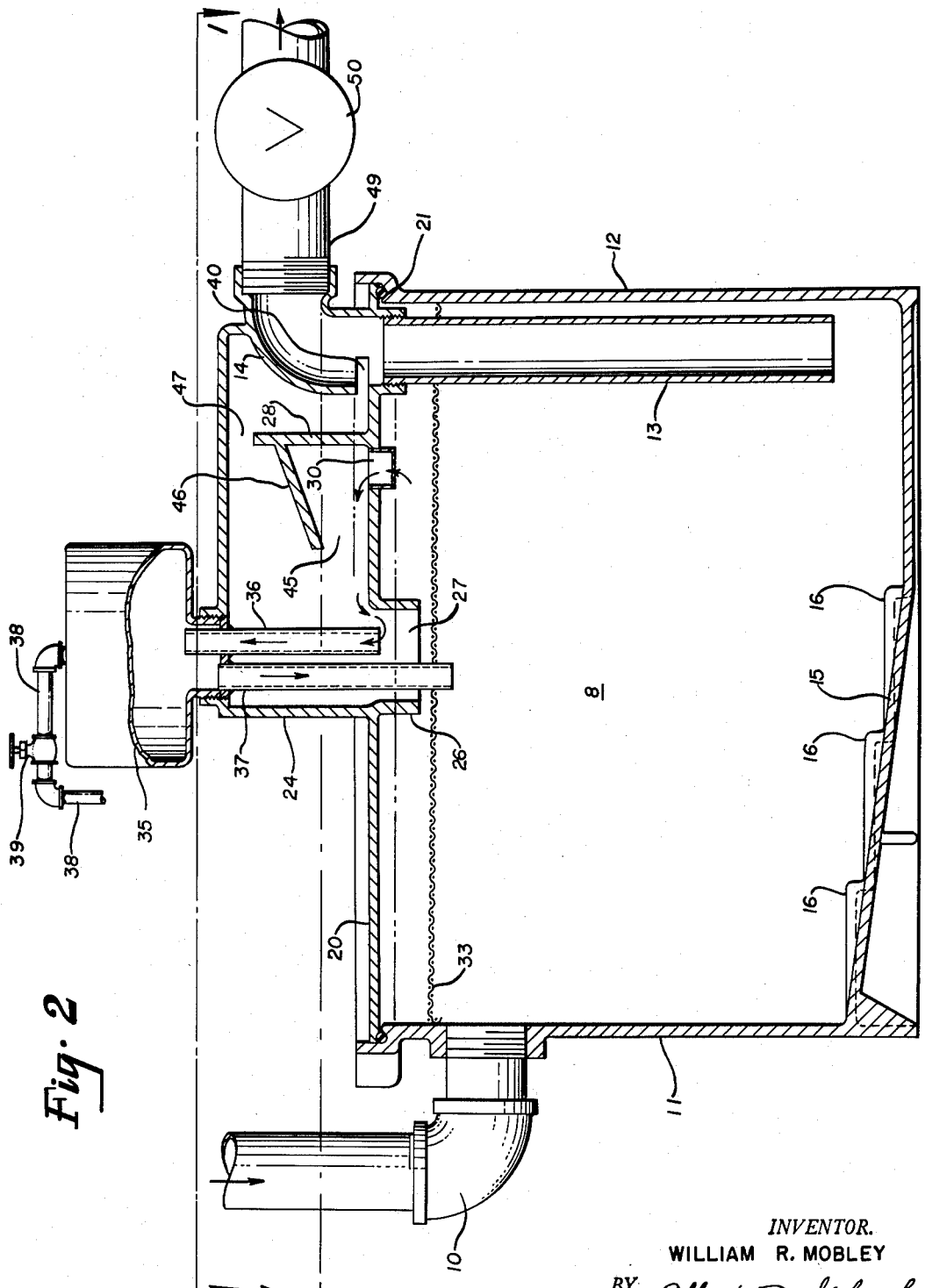

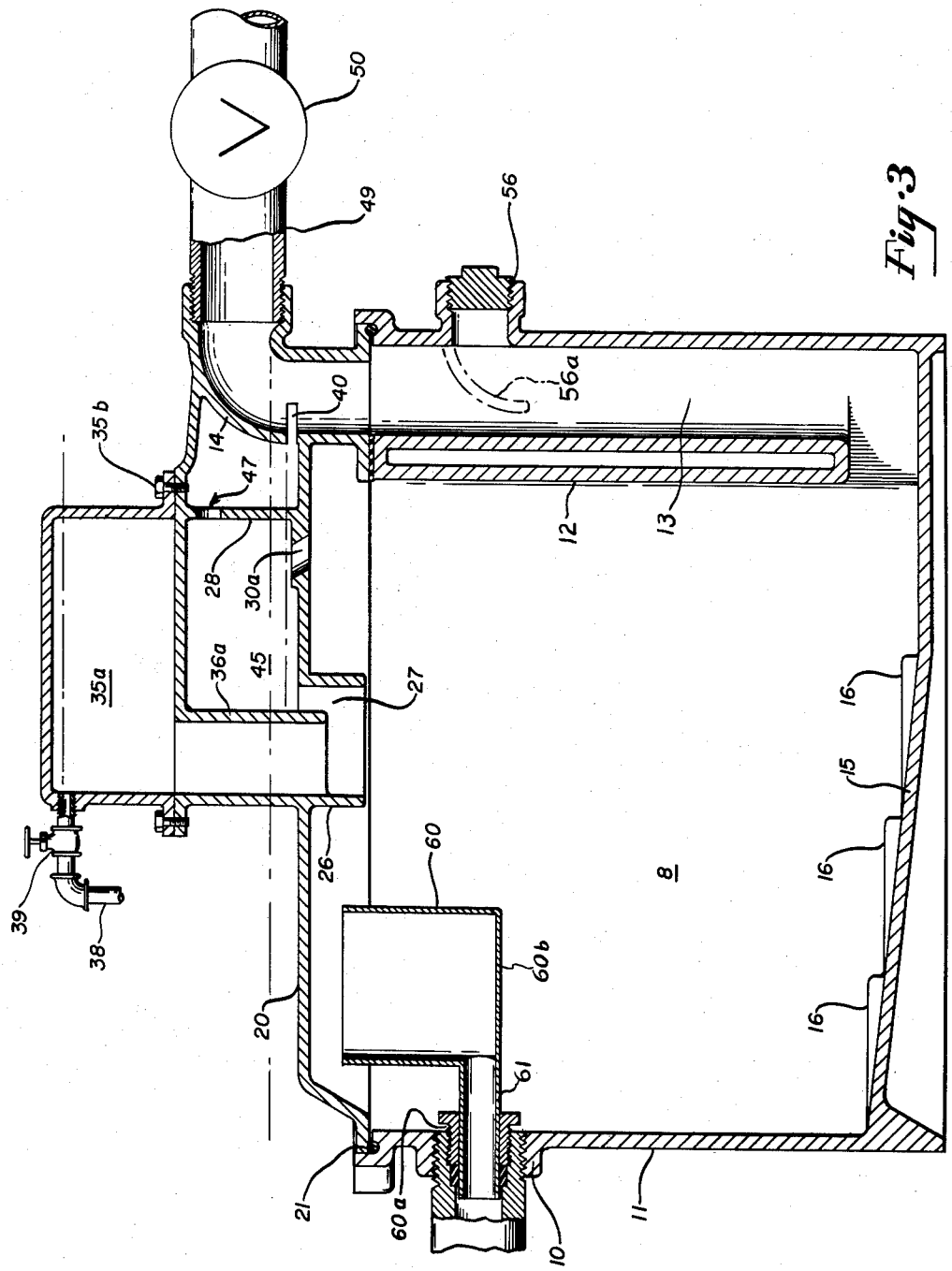

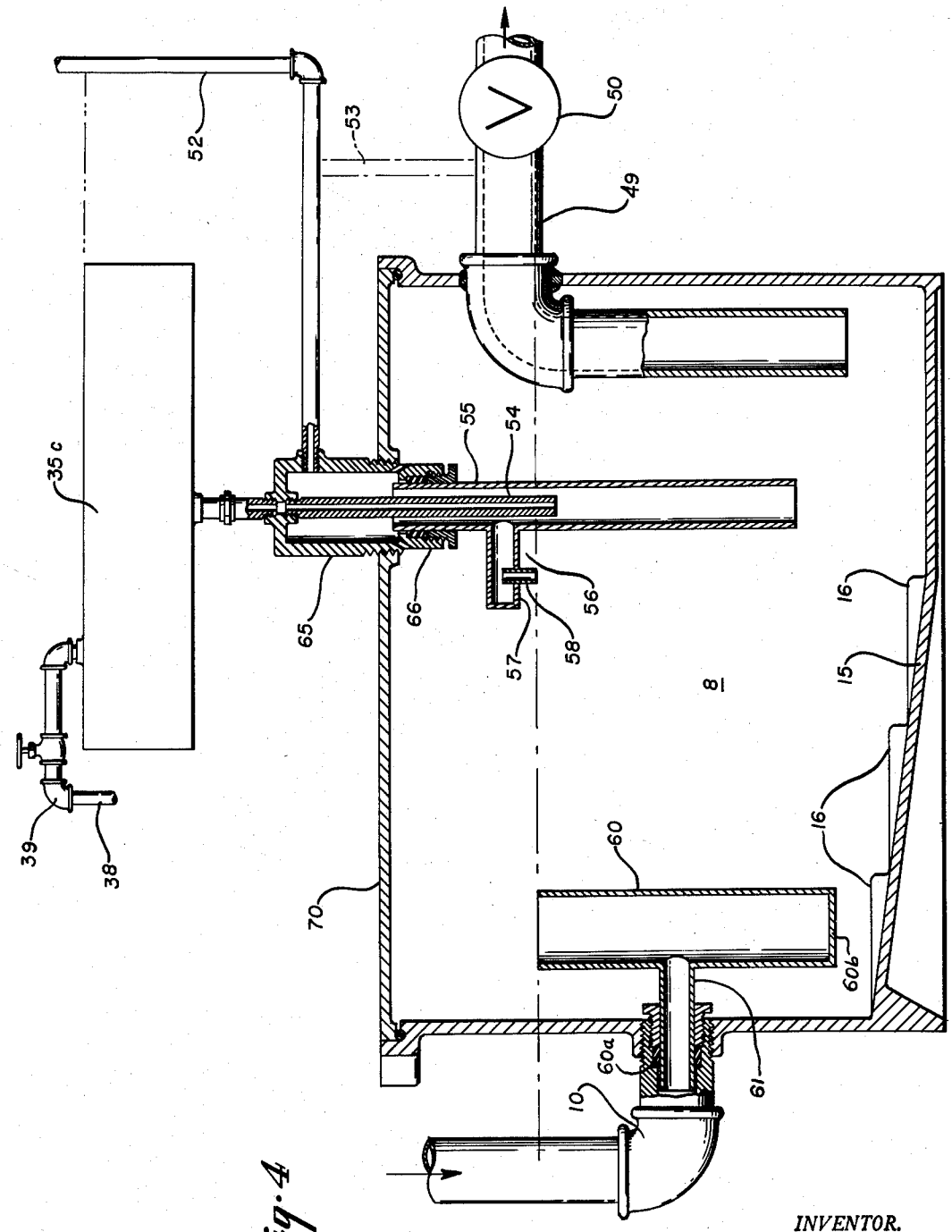

2,747,736

GREASE AND OIL INTERCEPTOR AND METHOD OF SEPARATING FLUIDS OF DIFFERENT SPECIFIC GRAVITIES

William R. Mobley, Miami, Fla.

Application September 16, 1952, Serial No. 309,752

7 Claims. (Cl. 210—56)

This invention is directed to the treatment of grease and oil bearing waste waters and the general object is to provide a method and apparatus for carrying out the method for the separation and recovery of greases and oils from discharging waste waters under continuous flow conditions.

More specifically my invention is concerned with the devising of an apparatus of acceptable construction for ready adaptability to installation in waste water systems and which will function to recover or separate the grease and oils from a continuous waste water discharge and remove the recovered greases and oils from the separating chamber of the apparatus in a manner which will conform to sanitary code requirements.

A further object is to improve the operation of grease interceptors of known commercial form by incorporating therewith grease and oil transferring device which will function simultaneously with any grease separating action of the apparatus to transfer the separated grease to an accessible chamber thereby permitting the removal thereof without necessitating the opening of the separating chamber.

A still further object is the provision of a method and means of removing greases and oils from effluent while preventing floatable or buoyant solids from being removed with the grease and ultimately automatically disposing of such solids.

A still further object is the provision of a grease separator which will be self cleansing of floatable solids.

A still further object is the provision of a method and apparatus therefor which will effect the separation of liquids and gases or liquids, solids and gases by operating on the buoyancy displacement principle of hydrostatic columns so arranged that separate stages of separation of the light gravity fluids, gases and floatable solids from a primary, relatively heavy gravity effluent can be brought about in a simple manner.

Other objects and advantages of the invention will be apparent from the following detailed description of preferred forms of embodiment of the invention, reference being made to the accompanying drawings wherein:

Fig. 1 is a top view of a grease interceptor shown connected into a waste water line and which incorporates my invention as adapted to the removal of greases and oils from waste waters and to the removal of floatable solids from the greases and oils;

Fig. 2 is a vertical cross sectional elevation taken centrally of the interceptor mechanism as indicated by the line 2—2 in Fig. 1;

Fig. 3 is a cross sectional elevation of another form of embodiment showing the adaptation of the invention to a well known commercial form of installed grease interceptor; and Fig. 4 is a cross sectional of a modified embodiment of the invention shown in Figs. 1 and 2 and taken along the line 4—4 of Fig. 2.

My present invention contemplates the utilization of the buoyance principle of separating light gravity fluids from effluent mediums of heavier gravity such as I disclose in my United States Patent No. 2,405,705 to grease interceptors of the continuous flow type adapted to be connected into and comprise part of the waste water lines of industrial plants, hotels, restaurants, and various other environments where greases and oils in the waste waters place a burden on sewage disposal systems. A large number of such interceptors or traps are in use and it has been well known that unless such interceptors are periodically opened and serviced by frequent removal of accumulated grease and oils and otherwise cleaned out, the separating chamber contents of the device become rancid, thus increasing the reluctance to clean them.

I have devised an arrangement of hydrostatic columns relative to the top grease collecting region of such interceptors whereby the greases and oils, after being segregated by the interceptor can be removed from the interceptor in a sanitary and automatic manner to a collecting and storage point remote to or outside of the grease separating chamber of the interceptor. This removal is accomplished in such manner that the entrained air always being introduced into the interceptor by the inflowing effluent is separated and vented continuously while out of contact with the stored greases and oils. I find that I can accomplish the foregoing while making provision for the prevention of ingress of floatable solids in the effluent to the separated and stored greases and oils, the floatable solids being arrested in a forceably submerged location at the top of the interceptor separating chamber until such time as they increase in weight, due to "waterlogging" whereupon they sink to the lower region of the separating chamber and from there are carried out of the device by the escaping separated waste waters.

Referring particularly to Figs. 1 and 2 of the drawings I show the body 8 of a grease interceptor substantially rectangular in basin shape and of considerable depth. An inlet line 10 enters the separating basin through the end wall 11 at a point spaced downwardly from the top of the basin structure. Adjacent an opposite end wall 12 I locate an outlet riser pipe 13 communicating with an elbow formation 14 located a substantial distance above the top region of the separating basin for purposes to be stated. The bottom wall 15 of the basin slopes from inlet end to outlet end and is provided with a series of shelves or step formations 16 which are bisected by a channel, i. e. the step formation is absent in the central region of the bottom structure and the general arrangement of steps and channel is such as to facilitate the evacuation of solids while preventing clogging of the outlet riser entrance should there be an unusual influx of non-floating solids into the separating chamber.

The drop in velocity of flow of the effluent entering the separating basin results in a separation of greases, floatable solids, oils and gas in the form of entrained air by the buoyant rising thereof to the top region of the separating chamber of the basin while the degreased effluent flows out of the basin through the riser pipe 13 carrying non-floating solids with it to the waste pipe.

Since it is my purpose to segregate or locate the floatable solids at a point or region where they will be subjected to a "soaking" action, I locate the outlet elbow above the basin structure thereby to have the bottom plane of the floating grease located above the plane of the under face of the basin closure structure which I will now describe.

A closure plate structure 20 is sealed to top flanges of the upper ends of the basin walls in a well known manner by clamp bolts (not shown) and sealing gasket to effect a gas tight seal of the upper region of the basin.

Preferably integrally formed with the closure plate is what I choose to call a control chamber structure comprising a box like structure 24 extending from the said region of the cover structure to the outlet elbow structure 14. An aperture in the cover structure is bounded by a downwardly extending annular flange 26 to form a well 27 in the top separated grease and air zone of the basin separating chamber. Insofar as the well aperture 27 is concerned a trapped region at the top of the basin is thus formed.

It is my purpose, however, to effect removal of the separated greases and oils from this trapped region in a continuous manner while leaving floating solids impinged against the underface of a screen panel extending from end to end and side wall to side wall of the separating chamber in a horizontal plane located between the top part of inlet 10 and lowermost part of well wall 26. To effect the grease and oil removal I provide a hydrostatic column in the form of a duct opening or pipe 30 shorter as to depth than the depth of well wall 26 and through which the greases and oils will rise out of the upper trapped region of the basin into a central chamber 45. Due to the elevation of the outlet elbow 14 relative to the basin closure structure the static water level of the system is located above the under surface of the closure structure and the separated greases and oils are lifted hydrostatically upwardly through opening 30 into the control chamber 45. Likewise any entrapped air in the top region of the basin above the lower end of well wall 26 will pass through opening 30 into the top region of the control chamber 45. A deflector 46 prevents the lighter fluids from being splashed into the air passage 47 extending between vent 40 and control chamber 45. If desired, screen 33 can be omitted and a screen placed about elevating pipe 30. If the column 30 is suitably screened to prevent the upward movement of floatable solids, the solids will thus remain immediately beneath the cover structure until the gravity thereof increases due to liquid absorption thus causing them to sink to the bottom of the basin and be evacuated in the manner described. When the horizontal screen 33 is used a like action will take place on the solids held on the under surface thereof.

It will be seen that the hydrostatic function of the duct 30 is to convey the separated greases and oils upwardly and above the annular baffle 26. After the greases and oils are thus caused to flow upwardly into the control chamber 45 through the column 30, the movement thereof is to then flow to the well formation 27 from whence the greases and oils are again hydrostatically elevated in a manner I will now describe.

I desire to isolate the separated grease and oils in such a location of storage that the accumulations thereof will be remote from the separating chamber and in such manner that the ejection thereof can be effected by arresting the outflow operation of the interceptor while continuing the inflow of liquid to the separating chamber 8, thus creating a pressure which will effect the expulsion of the isolated greases and oils. Accordingly I provide a storage chamber structure 35 of suitable construction which can be supported in any acceptable manner and at desired height above the control chamber structure and the well 27. A hydrostatic tube 36 for the greases and oils leads upwardly from the top region of the well 27 and has the upper end thereof terminating at the bottom of the storage chamber or tank 35. As shown, the lower end of column 36 terminates within the well structure at or slightly below the horizontal plane of the under face of the cover structure. Hence the lower end of the hydrostatic tube 36 is disposed below the upper end of the hydrostatic tube structure 30. Initially the storage chamber is filled with water and as the grease and oils are buoyed upwardly into the storage chamber 35 water is displaced downwardly in a tube 37 disposed to extend from the bottom of the storage tank downwardly to a point in the separating chamber below the annular baffle structure 26 of the well 27 and below the screen 33.

The entrained air separated from the effluent accumulates in the control chamber and passes therefrom through a vent opening 40 formed in the outflow elbow structure 14 at a point located below the normal static water level indicated by the horizontal dot and dash lines in Figs. 2 and 3. To prevent grease and oils from escaping through the vent 40 to the outlet line, a baffle wall 28 is provided in the control chamber structure thus forming a water seal which is broken by suction action of the outflowing effluent and pressure built up within the control chamber 45. Passageway in well 28 provides communication between the control chamber 45 and the vent opening 40. Trapped air is thus disposed of in a sanitary manner at a point remote from the hydrostatic actions of the columns 30 and 36.

The storage tank 35 is provided with a grease run-off pipe system 38 having a valve 39 which is opened when the apparatus is filled initially but closed during normal operation of the apparatus. A shut-off valve 50 in the outflow line is closed during the initial filling and the filling is effected by passing effluent through the inlet 10 until grease storage tank 35 is filled. When the apparatus is first primed the air or control chamber is nearly filled with the priming fluid in order to fill completely the grease storage chamber 35. When the outlet valve 50 is opened, immediately after priming, the water level in the air chamber adjusts to the normal static level of the outlet.

During operation, as grease and air enter the control chamber 45 through tube 30, the grease displaces the water in the control chamber gradually depressing the water level therein. When this level is thus depressed to the bottom of tube 36 grease then passes up the tube 36 to the storage chamber and a relation of water and grease levels is thus established and maintained automatically with relation to the bottom end of tube 36. During such establishment of grease and water levels air accumulates in the control chamber and resulting pressure depresses the water level seal of the vent 40 until air escapes to the outlet through the trapped vent opening. The source of this air is the air introduced into the separating chamber by the inflowing effluent which rises to the top wall of the separating chamber and passes through the screened opening 30 to the control chamber at a point remote from the lower end of tube 36. Thus the disclosed system is automatic in its tendency to dispose of the troublesome air while maintaining the desired grease and water level relationship to the lower end of hydrostatic tube 36. Any disturbance of this relationship due to intermittent surging caused by intermittent discharges into the inflow line 10 merely interrupts grease elevation until the grease and water levels become approximately stabilized.

When it is desired to remove the accumulated greases and oils from the storage chamber 35, the outlet valve 50 is closed and water is introduced in the inlet pipe 10, thus creating a pressure on the grease in chamber 35, opening of the valve 39 then effects ejection of the grease through discharge line 38.

In Figure 3 I have shown a simplified construction of the control chamber construction and wherein the cover structure and associated parts are adapted to be attached to a previously installed interceptor by substituting the disclosed cover structure and associated parts for the old cover structure of the interceptor. The old outlet branch shown at 56 is plugged and the waste pipe is connected at a higher point to the outlet elbow structure 14. The outlet riser deflector shown by dot and dash lines 56a is cut out. If desired, this old outlet may be retained by having the outlet pipe extend vertically from the outlet connections and elbow fittings used to make connections to the elevated pipe 49 and valve 50. Chamber 45 would then be seal vented through a pipe connection between the chamber and pipe 49. Elbow structure 14 would then be omitted in the cover structure and the inner end of the vent pipe would terminate at the level of vent 40 in Fig. 2, but the vent 40 would not be present.

In this Fig. 3 form the down flowing tube 37 is omitted and the hydrostatic tube structure 36a is increased in cross sectional area over that of tube 36 whereby it may serve the double function of being an upflow conduit for the grease and a downflow duct for the liquid displaced by the grease from the grease storage chamber 35a. It will be noted that the lower end of the hydrostatic column 36a terminates at about the plane of the cover and body seat and below the static liquid level of outlet elbow 14. A removable solids retainer 60 is slip fitted to the inlet opening and has a closed bottom 60b for retaining sand and gravel contained in the effluent, such as crude oil and water, and extends vertically to substantially lower grease level. The hydrostatic duct 30a does not extend vertically but slants toward the tube structure 36a thus directing any rapidly elevated grease and oil away from the baffle wall.

The operation of priming and of ejecting the greases and oils from storage chamber 35a in using this form would be the same as that described with reference to the Fig. 2 form.

The prevailing pressures from location to location of the fluids within the apparatus varies of course in relation to the control exercised by the functioning of the apparatus with respect to atmospheric pressure. The prevailing pressure within the grease storage chamber is negative to the atmosphere to the extent it is elevated above the normal or static liquid level of the apparatus. This pressure decrease at sea level amounts to about .038 lbs. decrease in pressure in the grease storage chamber per inch of elevation of the grease storage chamber above the static level of the liquid in the main apparatus. The pressure of the separated air within the top region of the control chamber at times may exceed atmospheric pressure; the excess being determined by the height of the liquid column seal present above the air vent opening 40 and this pressure will vary somewhat due to the surging action of the effluent when intermittently discharged into the apparatus. Hence some variation in the pressures prevailing at the bottom of the hydrostatic columns 36, 36a will take place. The ideal location of the bottom of these columns would be slightly below the horizontal meeting plane of the top of the relatively heavy effluent and the bottom of the overlying layer of relatively light gravity greases and oils. Since, however, there is some fluctuation in the volume of effluent present in the apparatus during operation the location of the elevation of the top plane of the effluent will vary somewhat. Accordingly I find it desirable to so locate the bottom of the tube 36 or 36a that there will be no ingress of air from the control or air chamber into the hydrostatic column 36. By excluding the air from the grease storage chamber oxidation and degeneration of the storaged greases and oils is prevented and it will be found that the recovered greases and oils, when ejected from the storage tank 35 in the manner described, will be fresh and unrancid.

In Fig. 4 I disclose a modification of the embodiment shown in Fig. 2 in that the entrained air, as it is separated from the effluent, is passed out of the apparatus through a non-trapped vent pipe 52 or as indicated in dot and dash lines at 53 to the outlet line 49 at a point between the separator and valve 50. In this type the low pressure storage chamber 35c is elevated remote from the separating chamber structure. The venting is effected after the manner shown and described in my application Serial No. 161,347. The skimmer extends into the separating chamber 8 on an air dome 65 which is connected to the bottom of the low pressure chamber 35c and terminates below the static liquid level in the chamber 8. A hydrostatic tube 54 is surrounded by tube 55. Tube 55 is open at its lower end and terminates near the bottom of chamber 8 and communicates at its top with air dome 65. The air relief pipe 52 leads from the top of the dome 65 to a point of disposal at atmospheric pressure.

A T formation 56, closed at its left branch 57, is provided with a skimmer pipe 58 with its lower end disposed at or below the static liquid level in chamber 8. The skimmer pipe 54 passes through the air dome up to the chamber 35c, in air tight relation thereto. The lower end of the skimmer pipe determines the skimming level and terminates in the skimmer T formation 56. It will be noted that if the skimmer pipe 58 terminates below the static liquid level, as shown, a skimmer level is established and which will not prevail in the separating chamber until sufficient lighter gravity liquid has separated and accumulated to depress the static liquid level a slight amount. An adjustable slip joint generally indicated at 66 permits vertical adjustment of skimmer tube 58. When the various apparatus as shown are used for separation and skimming of effluent intermittently discharged thereinto, such as when the apparatus is attached to a dish washing machine, some fluctuation of the static liquid level location takes place. Accordingly the bottom terminus of the skimmer pipe should always be located a sufficient distance below the static liquid level to never be exposed to any air or gases located above the liquid contents of the separating chamber. I find that about one-eighth of an inch below the static level is sufficient, although a greater distance can be used with resultant presence of more separated lighter liquids remaining in the separating chamber.

I find that fluctuation of the liquid levels within the separating chambers can be considerably reduced by the use of an inflow interceptor associated with the inlet duct 10. This device may comprise a removable, submerged vessel 60 mounted on a slip sleeve 61 mounted in the inlet duct 10. The vessel 60 opens upwardly, thus causing the effluent to be directed upwardly toward the top region of the separating chamber 8. The arrangement facilitates the separation and direction of the entrained air and gases to the top region of the separating chamber and the respective levels are maintained more nearly constant regardless of variations of the level of the outflowing relatively heavy separated liquid flowing out of the outlet 49.

In each of the illustrated apparatuses, the relation of the bottom terminus to the static liquid level in the separating chamber 8 is determined in the manner described with reference to the apparatus of Figs. 2 and 3. In the absence of the level stabilizer shown in Figs. 2 and 3 the bottom terminus should always be sufficiently below the location of the bottom of the discharge or outflow pipe 49 to prevent the escape of air or gases into the skimmer pipe and into the low pressure storage chamber 35c. In the Figs. 2 and 3 constructions the amount of pressure on the separated air and gases in the top of the separating chamber is determined primarily by the extent of location of the vent 40 below the static liquid level in the outlet elbow 14. In the devices of Fig. 4 the pressure on the separated air and gases in the top of the separating chamber is substantially atmospheric since direct venting to the atmosphere is effected.

In the Figs. 2 and 3 constructions the floating solids are brought up against the under side of the roof or top of the separating chamber or the screen 33 and tend to remain impinged until saturated with the heavier liquid whereupon buoyancy is lost and the saturated solids sink toward the bottom into the path of the flowing separated heavier liquid and thus are carried out of the apparatus.

In the Fig. 3 conversion construction only two castings are involved in its manufacture. The storage chamber structure is cast separately from the casting forming the lid structure. The two parts are suitably inclined for air tight attachment of the storage chamber to the top structure of the control chamber and secured thereon by suitable means such as bolts 35a.

All forms of the apparatus are provided with the outlet shut off valve 59 and valve 39, since all forms are conditioned for operation after the manner disclosed with reference to the Fig. 2 apparatus.

To those skilled in the art it will be apparent that while I have here disclosed apparatus to carry out the steps of my method, the invention can be adapted readily to various industrial uses for effecting the separation of liquids and gases, or liquids, solids and gases of different specific gravity in continuous flow operating systems. In the oil refining industry, for example, gravity separation of liquids accompanied by volatilization of part of the effluent constituents can be effected in the manner described by adapting the disclosed apparatuses to such purposes.

I claim:

1. An apparatus for the recovery of greases and oils from waste water comprising a continuous flow grease separating trap body having a separating chamber and an outlet located above the inlet and an air sealed top closure member whereby the grease separating chamber of the body is adapted to be a flow part of a waste water line, said closure member comprising a chambered structure disposed above the separating chamber of the body and comprising an air chamber, a second chambered structure sealed to the atmosphere and disposed above the chamber of the closure structure, and a conduit extending downwardly from the second chambered structure to the top level region of the separating chamber for the hydrostatic conveyance of separated grease and oils from the separating chamber upwardly past the air chamber to the second chamber when the passageway and the separating chamber and the second chamber are filled with liquid to form a hydrostatic column and said air chamber structure having an air outlet extending into the discharge outlet below the normal liquid level of the device.

2. An apparatus for the recovery of greases and oils from waste water comprising a continuous flow grease separating trap body having a separating chamber and an outlet located above the inlet and an air sealed top closure member whereby the grease separating chamber of the body is adapted to be a flow part of a waste water line, said closure member comprising a chambered structure disposed above the outlet structure of the device, said chambered structure comprising an air chamber in communication with the separating chamber of the trap body, a second chambered structure, selectively sealed to the atmosphere and disposed above the air chamber of the closure structure, a passageway structure between the chamber of the closure structure and the top region of the trap body separating chamber, a conduit extending downwardly from the second chambered structure to the top level region of the separating chamber for the hydrostatic conveyance of separated grease and oils from the separating chamber upwardly to the second chamber when the passageway of the separating chamber and the second chamber are filled with liquid and a shut off valve located in the outlet of the device for closing the path of flow of the waste waters through the device whereby a hydrostatic column may be established between the separating chamber and the second chamber by flow of liquids through the inlet when the outlet is closed.

3. An apparatus for the recovery of greases and oils from waste water; a continuous flow grease separating trap body having a separating chamber and an outlet located above the inlet and an air sealed top closure member whereby the grease separating chamber of the body is adapted to be a part of a waste water line, said closure member comprising a chambered structure having an air chamber formation vented to the outlet structure of the device, a second chambered structure selectively sealed to the atmosphere and disposed above the air chamber of the closure structure, a passageway structure between the air chamber of the closure structure and the top region of the trap body separating chamber, a conduit extending downwardly from the second chambered structure to the top level of the separating chamber for the hydrostatic conveyance of separated grease and oils from the separating chamber upwardly to the second chamber when the passageway and the separating chamber and the second chamber are filled with liquid and a shut off valve located in the outlet of the device for effecting a liquid filling of the conduit and second chamber.

4. An apparatus for the recovery of greases and oils from waste water carrying floatable solids comprising a continuous flow grease separating trap body having a separating chamber and an outlet located above the inlet and an air sealed top closure wall whereby the grease separating chamber of the body is adapted to be a part of a waste water line, said outlet determining the static liquid level in the grease separating chamber of the trap body, said closure wall comprising an air chamber structure vented to the outlet structure of the device, a second chambered structure selectively sealed to the atmosphere and disposed above the air chamber of the top closure wall, a passageway structure between the chamber of the closure structure and the top region of the trap body separating chamber forming a grease and floatable solids baffle, a conduit extending downwardly from the second chambered structure to the top level of the separating chamber for the hydrostatic conveyance of separated grease and oils from the separating chamber upwardly past the air chamber to the second chamber when the passageway and the separating chamber and the second chamber are filled with liquid, said air chamber having an air outlet extending into the discharge outlet below the static liquid level of the device, and a baffle wall within the air chamber located between the air vent to the outlet and said baffled passageway.

5. In a grease and oil interceptor apparatus adaptable for use in waste water flow lines wherein the effluent contains floatable solids, a grease and floatable solids separating trap having a separating chamber, an apertured top closure structure for the chamber, an effluent inlet disposed below the top region of the separating chamber, an outlet structure extending out of the separating chamber from the bottom region thereof at a position remote from the inlet and determining the static liquid level of the chamber, a grease and oil removing means disposed above the top region of the separating chamber and hydrostatically communicating through an aperture of the top structure with the top region of the separating chamber, said separating chamber being located completely below the static liquid level of the outlet, a baffle structure surrounding the said top closure aperture and depending into the top region of the separating chamber thereby to form a grease and floating solids space immediately beneath the underside of the top closure structure, an air chamber disposed between the grease removing means and the grease separating chamber and vented to the outlet, said top closure having a screened aperture, forming a communication between the air chamber and the top region of the separating chamber, there being a baffle wall within the air chamber separating the last named aperture and the air vent to the outlet, said outlet being disposed above the bottom region of the air chamber whereby the static water level of the outlet is on a horizontal plane above the air vent.

6. A grease and oil separator comprising, a control chamber mechanism, a main separating chamber and a remote grease accumulating chamber, a passageway structure extending between the control chamber and the top region of the separating chamber, including a grease baffle structure serving to prevent separated grease in the main separating chamber from entering the passageway, a hydrostatic column extending heightwise of the control chamber of less horizontal cross section than the passageway and adapted to establish communication between the said passageway and the grease accumulating chamber, a second passageway structure between the control chamber and the top region of the separating chamber to bi-pass said passageway and extending from below to above the bottom of the hydrostatic column and an air outlet extending from the control chamber to an outlet of the separating chamber at a point above the said top region of the separating chamber.

7. The method of removing greases and oils which have been separated from a continuous flow of effluent comprising the steps of hydrostatically elevating the separated greases and oils to a position above the initial locus of the separated greases and oils relative to the effluent thereby to liberate air and gases therefrom, elevating the greases and oils above the said first stage of elevation through a hydrostatically maintained column and subjecting the elevated greases and oils to pressure in excess of atmospheric pressure while hydrostatically maintaining said column by exerting increased pressure on the effluent and the greases and oils in the column when the upper region of the column is exposed to atmospheric pressure.

References Cited in the file of this patent

UNITED STATES PATENTS

| Number | Name | Date |
|---|---|---|
| 639,519 | Camiz et al. | Dec. 19, 1899 |
| 774,808 | Wheelwright | Nov. 15, 1904 |
| 1,045,811 | Buhring | Dec. 3, 1912 |
| 1,200,951 | Kelly | Oct. 10, 1916 |
| 1,938,604 | Mobley | Dec. 12, 1933 |
| 2,059,844 | Boosey | Nov. 3, 1936 |
| 2,405,705 | Mobley | Aug. 13, 1943 |
| 2,479,386 | Mathers | Aug. 16, 1949 |